United States Patent [19]

Yetter

[11] 4,301,455

[45] Nov. 17, 1981

[54] GROUNDSPEED MEASUREMENT SYSTEM

[75] Inventor: Forrest G. Yetter, Alexandria, Va.

[73] Assignee: United States of America, Washington, D.C.

[21] Appl. No.: 85,664

[22] Filed: Oct. 17, 1979

[51] Int. Cl.³ .............................................. G01S 1/44
[52] U.S. Cl. ......................... 343/106 D; 343/113 DE
[58] Field of Search ....... 343/106 D, 108 M, 113 DE, 343/112 S

[56] References Cited

U.S. PATENT DOCUMENTS

| 3,605,095 | 9/1971 | Higgins ........................... 343/112 S |
| 3,787,861 | 1/1974 | Becavin et al. ................. 343/106 D |
| 3,893,118 | 7/1975 | Overbury ....................... 343/106 D |

Primary Examiner—Theodore M. Blum
Attorney, Agent, or Firm—Otto M. Wildensteiner; Harold P. Deeley, Jr.; N. J. Cafarelli

[57] ABSTRACT

A measurement system for determining the groundspeed of an aircraft during final approach and landing, by measuring at the aircraft the Doppler shift of a radio signal, and/or its modulation components, transmitted by a fixed ground station. The carrier signal is allowed to drift; it is provided with a modulated tone on the carrier having a frequency signature that identifies the direction and magnitude of this carrier frequency drift. In a second embodiment the Doppler cycles are not counted directly, but rather fixed increments of a cycle wavelength are measured; the time period of each segment is inverted to obtain a value proportional to the Doppler frequency.

12 Claims, 8 Drawing Figures

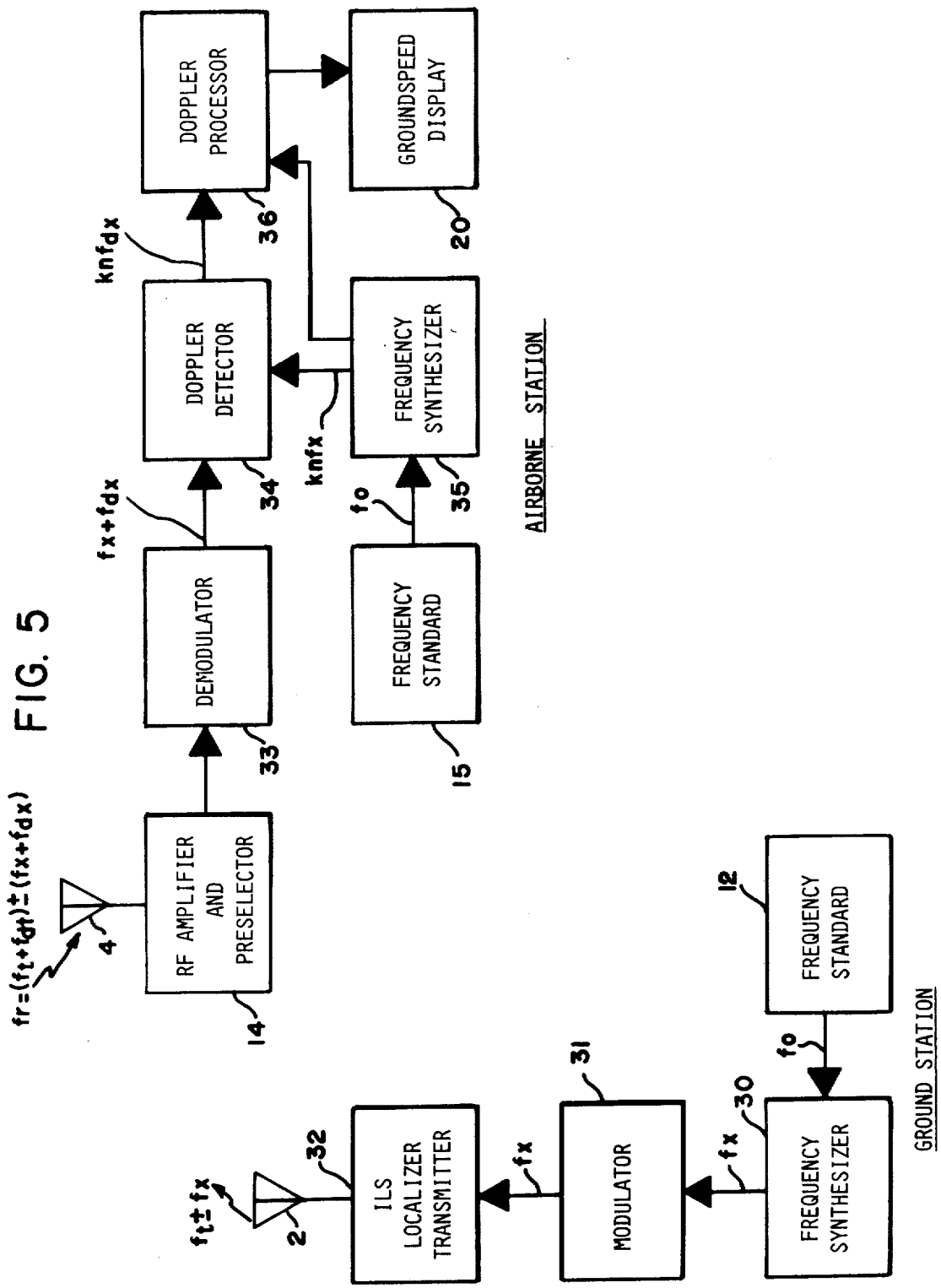

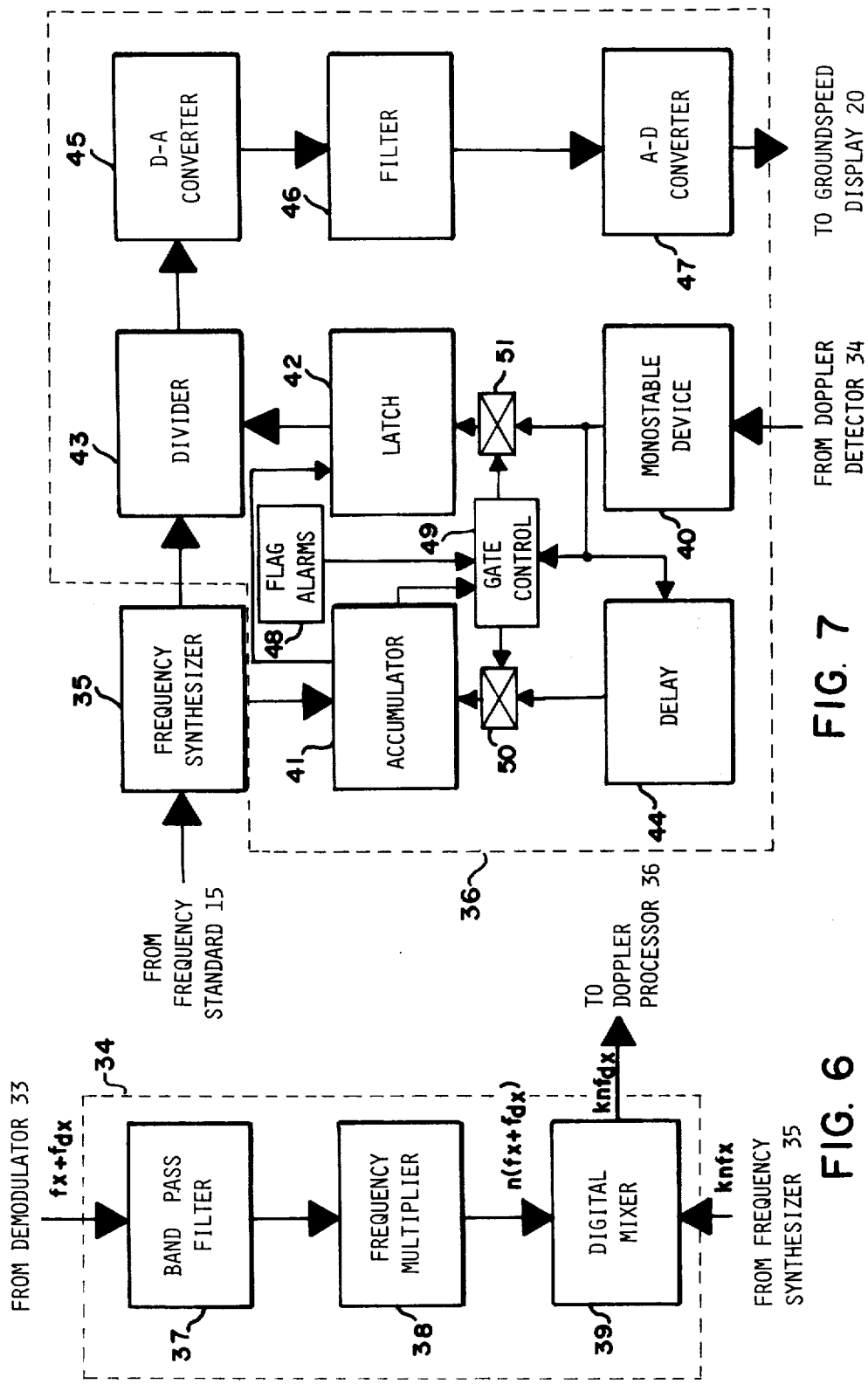

GROUNDSPEED MEASUREMENT SYSTEM

STATEMENT OF GOVERMENT INTEREST

The present invention was made by an employee of the Department of Transportation and may be practiced by or for the goverment of the United States without the payment of any royalties thereon or therefor.

BACKGROUND

This invention relates to groundspeed measurment systems, using the Doppler shift in the radio frequency of a signal transmitted by a fixed ground station and received by a moving airborne station. Several inventions that use the Doppler principle for groundspeed measurement are found in U.S. Patent Classification 343-112.

Present groundspeed systems are designed for enroute operation, when groundspeed does not change significantly over short periods of time. However, during an approach to landing atmospheric changes may necessitate faster control response which requires more timely groundspeed information. Some present systems that operate on the Doppler principle normally transmit signals from the aircraft to the ground at various angles, and compare the frequencies of the transmitted and reflected signals. The difference between these frequencies is a measure of the velocity component of the aircraft's motion relative to the reflection regions, and this information with the system geometry is processed to obtain groundspeed. Another conventional technique is to measure the distance between the aircraft and ground station with distance measuring equipment (DME) that measures the time between the transmission of an interrogator pulse by the aircraft and the reception of the reply pulse from the ground station transponder. The groundspeed is related to the differnce in distance between successive measurements. These systems normally cannot meet the specific need for precision groundspeed measurements by a conventional aircraft during a final approach and landing, or by a helicopter during an approach to hover, particularly when atmospheric anomalies are encountered. Inertial navigation systems can provide the required precision, but the cost is prohibitive for most aircraft, in particular general aviation aircraft. This invention accordingly fills a need to provide this precision measurement with considerably more cost effective avionics.

SUMMARY

Briefly, the present invention is a method of measuring the groundspeed of an aircraft on final approach and landing, by measuring at the aircraft the Doppler shift of a radio signal, and/or its components, transmitted by a ground station. In one embodiment of the invention the carrier signal is allowed to drift, even by an amount that normally would make a Doppler technique not feasible. The carrier is modulated with a tone having a frequency signature that identifies the direction and magnitude of this carrier frequency drift. The carrier is detected by the airborne receiver, its measured frequency being determined by (a) the intended carrier frequency; (b) the drift of the frequency from its intended value caused by equipment anomalies and temperature changes; and (c) the Doppler shift caused by aircraft motion. The intended carrier frequency is known, and the drift information is conveyed to the aircraft by the modulation on the transmitted carrier. The Doppler shift, which is the difference between the received carrier frequency and the intended carrier frequency corrected for drift, is determined and converted to ground speed by the airborne receiver and processor.

In another and preferred embodiment of the invention, the Doppler cycles are not counted directly, but rather fixed increments of a cycle wavelength are measured with utmost precision. The time measurement of each increment is inverted to obtain a value proportional to the Doppler frequency.

Accordingly, it is an object of this invention to provide groundspeed information to the pilot, in particular during the critical landing approach phase of the flight.

It is a further object to provide this information without an active airborne component such as a transmitter that normally is required for this measurement.

A still further object is to accomplish this groundspeed measurement without installing new and special purpose ground stations, but rather by providing precision modulations on signals that now are emitted from existing ground stations.

While it is the present intention to apply these modulations to the localizer transmitter of the instrument landing system, it also could be applied to the VOR and to other navigation facilities. It is further intended that the capability be provided as an adapter to existing airborne receivers.

BRIEF DESCRIPTION OF THE DRAWINGS

FIG. 5 shows a system block diagram of an embodiment that modulates the transmitted carrier, and measures the Doppler shift of the modulation.

FIG. 6 shows a representative Doppler detector that is particularly suited as a component of the FIG. 5 embodiment.

FIG. 7 shows a representative Doppler processor for converting increments of wavelength to ground speed.

DETAILED DESCRIPTION OF THE INVENTION

Figure 1:
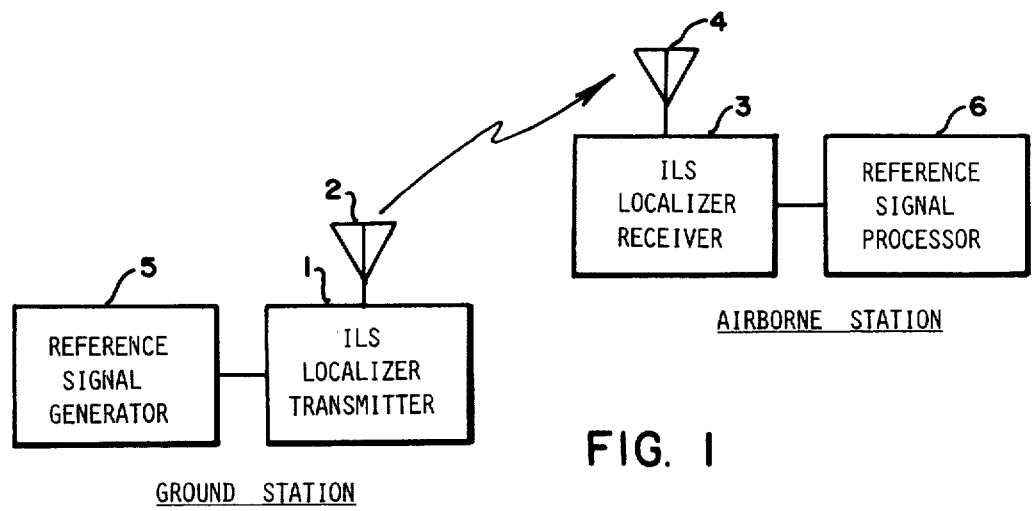
FIG. 1 shows a system block diagram that is applicable to all embodiments of my invention; the localizer transmitter and receiver in this and subsequent figures are for illustration purposes only since the operation of this groundspeed sensor is not dependent upon the primary functions of these components.

FIG. 1 shows a ground station and an airborne station equipped for measuring the groundspeed of the airborne station, this being defined as the range rate of the airborne station relative to the ground station. ILS localizer transmitter 1 performs its usual function of radiating an angle guidance signal from transmitter antenna 2, and this signal is received by localizer receiver 3 via receiver antenna 4. The groundspeed measurement capability is added to this angle measurement capability, while not degrading the latter capability in any manner. It is emphasized that these localizer components are used for illustration purposes only, and that this groundspeed indicator invention could operate with any ground transmitter and airborne receiver. All embodiments of this invention require a reference signal generator 5 for precise control of a specified parameter of the transmitter signal such as carrier frequency or modulation frequency, and a reference signal processor 6 to extract the Doppler shift component either directly or by differential ranging from the received signal.

Figure 2:
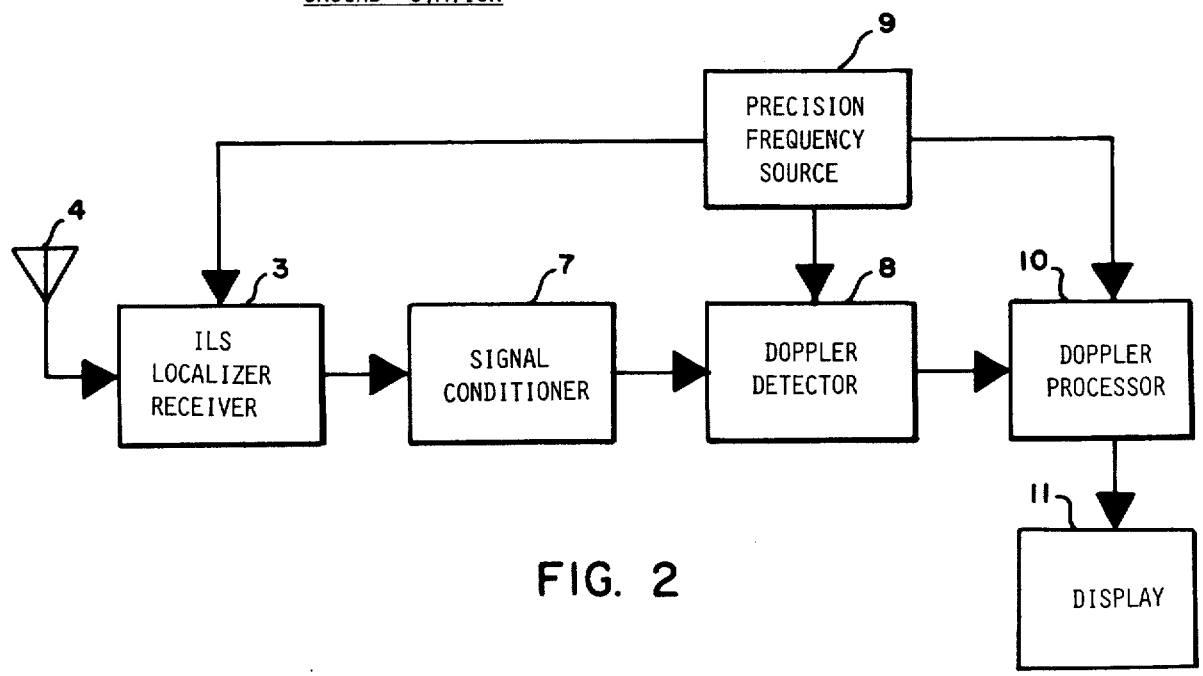
FIG. 2 shows a block diagram of a localizer receiver with groundspeed adapter components that is generically applicable to all embodiments of my invention.

FIG. 2 shows a functional flow diagram of the localizer receiver with the refernce signal processor. The transmitted signal, with its Doppler shift and with contaminants such as noise and transmitter drift, is received by localizer receiver 3 via receiver antenna 4. The local oscillators for the mixers in localizer receiver 3 are provided by precision frequency source 9. Signal conditioner 7 removes some of the signal contaminants by mechanical, ceramic, or digital filters, or by filter equivalents such as the phase locked loop. Doppler detector 8 isolates the Doppler component of the received signal and extracts that signal component by comparing the received signal with a signal generated by precision frequency source 9. Doppler processor 10 converts the Doppler shift as measured by Doppler detector 8 to groundspeed units, which are displayed on display 11.

Figure 3:
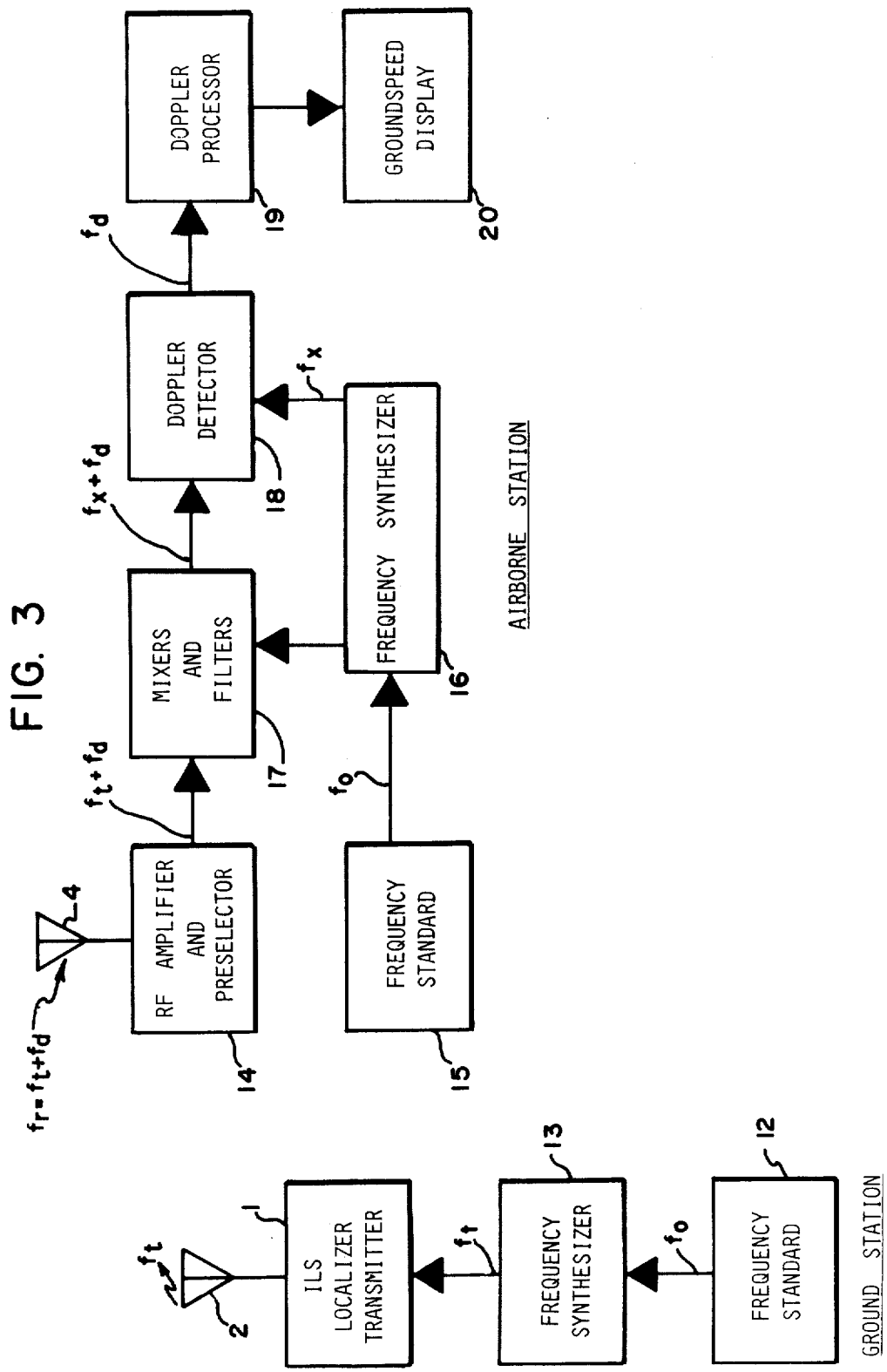
FIG. 3 shows a system block diagram of an embodiment that measures the Doppler shift in a precision stablized transmitted carrier.

FIG. 3 shows a basic embodiment of my invention that provides a capability of measuring the groundspeed, or range rate, of the airborne station relative to the ground station. Ground frequency standard 12, preferably a rubidium clock or an oven controlled quartz crystal for maximum stability, provides the source frequency $f_o$ which actuates the frequency synthesizer 13 that digitally controls the carrier frequency $f_t$. ILS localizer transmitter 1 amplifies and transmits $f_t$ via transmitter antenna 2. ILS localizer transmitter 1 normally is modulated by angle guidance, voice, and station identification signals, but these modulations are not relevant to my invention and accordingly are neither shown nor described. When the transmitted signal of frequency $f_t$ is shifted by the Doppler effect by an amount $v\lambda$, where v is the groundspeed and $\lambda$ is the wavelength of the transmitted frequency $f_t$, the frequency of the received signal is $f_r = f_t + f_d$, where $f_d$ is the Doppler shift $v/\lambda$. The received signal enters the ILS localizer receiver via RF amplifier and preselector 14, which accepts and amplifies only the desired signal $f_r$. Airborne frequency standard 15 is pre-set to substantially the exact frequency as ground frequency standard 12, and frequency synthesizer 16 digitally generates the ILS localizer receiver mixing frequencies,. These mixing frequencies are heterodyned with the received signal and filtered in mixers and filters 17, such that the output to Doppler detector 18 is $f_x$ when there is zero range rate of the airborne station relative to the ground station. It is the nature of heterodyning, and the crux of this embodiment of my invention, that the Doppler shift $f_d$ on the higher carrier frequency $f_r$ will maintain its value at the mixer output, and thus that output will be $f_x + f_d$. Th output of mixers and filters 17 then is heterodyned in Doppler detector 18 with frequency $f_x$ generated by frequency synthesizer 16. The heterodyned output of Doppler detector 18 is the Doppler shift frequency $f_d$, and this value is converted to groundspeed v by computing $v = f_d \lambda$ in Doppler processor 19, and the output of that processor actuates groundspeed display 20.

Figure 4:
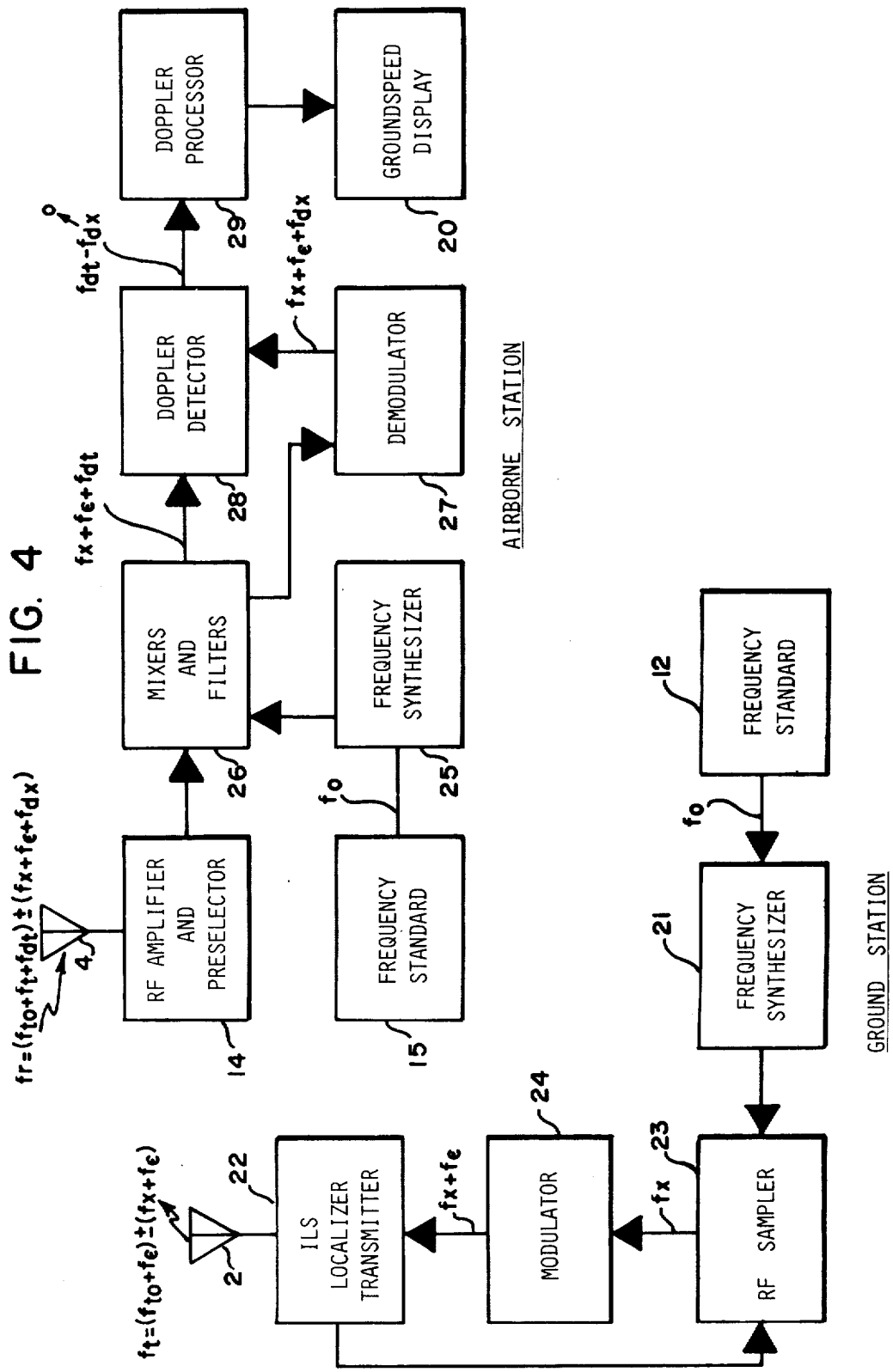
FIG. 4 shows a system block diagram of an embodiment that modulates the transmitted carrier with a frequency that is proportional to the frequency drift of that carrier.

FIG. 4 shows an embodiment of my invention that does not depend upon a precision frequency controlled carrier. An advantage of this embodiment is that the groundspeed measurement capability can be provided for existing ground based facilities by adaptors, rather than requiring redesign of the basic facility. The feature of this embodiment is that the transmitted signal is modulated by a tone that is phase coherent with the carrier frequency with the same absolute value of drift. The manner in which the modulation drift is used to cancel the carrier drift is the essence of this embodiment of my invention. Ground frequency standard 12 has been described in association with the FIG. 3 embodiment. Frequency synthesizer 21 generates a sampling frequency and would be unnecessary whenever the proper sampling frequency could be generated directly by frequency standard 12. ILS localizer transmitter 22 in this embodiment differs from the FIG. 3 transmitter in that its carrier frequency is not necessarily precision controlled, but is permitted to drift over a moderate range of frequencies from causes such as voltage transients and temperature variations. The transmitted carrier frequency $f_t$ is radiated by transmitter antenna 2, and a portion of this energy is fed back to RF sampler 23. The carrier radio frequency is sampled in RF sampler 23 at intervals established by the frequency synthesizer 21, the result being an amplitude envelope having a frequency that varies with a drifting carrier frequency $f_t$. A carrier drift $f_\epsilon$ causes the output of RF sampler 23 also to drift by an amount $f_\epsilon$. Modulator 24 modulates the carrier with the sampling frequency $f_x$ plus the carrier drift $f_\epsilon$, and thus the carrier drift information is conveyed to the airborne station by the modulation. When the transmitted signal of frequency $f_t$ arrives at ILS localizer antenna 4 its component frequencies are shifted by the Doppler effect by an amount $v/\lambda$, where the wavelength for computing the Doppler shift $f_{dt}$ on the carrier is considerably less than the wavelength for computing the Doppler shift $f_{dx}$ on the modulation. In fact, for this embodiment the value $f_{dx}$ is insignificantly small and could be ignored in the computation.

Airborne frequency standard 15 as in the FIG. 3 embodiment is pre-set to substantially the exact frequency as ground frequency standard 12, and frequency synthesizer 25 digitally generates the mixing frequencies. The received signal is routed via RF amplifier and preselector 14 to mixers and filters 26, where it is heterodyned with the mixing frequencies provided by frequency synthesizer 25 to generate an intermediate frequency $f_x$ that retains the carrier Doppler shift $f_{dt}$ but is contaminated by the transmitter signal drift $f_\epsilon$. The received signal also is demodulated by demodulator 27, to isolate the modulation frequency $f_x$ with its drift which also includes the Doppler shift on the modulation which in this embodiment has negligible effect on the measurement. The mixer and demodulator outputs are again mixed in Doppler detector 28 to isolate the Doppler shifts $f_{dt} - f_{dx}$, where $f_{dt} >> f_{dx}$ and thus the $f_{dx}$ term can be neglected. The Doppler shift $f_{dt}$ is converted by Doppler processor 29 to groundspeed units, and displayed by groundspeed display 20.

FIG. 5 shows an embodiment of my invention that determines groundspeed by measuring the Doppler shift on the modulation, with the carrier serving only to convey the modulation from the ground station to the airborne station. Specifically, ground frequency standard 12 generates a precision controlled frequency $f_o$. Frequency synthesizer 30 generates the appropriate frequency for modulator 31, which modulates ILS localizer transmitter 32, the signal being radiated by transmitter antenna 2. A signal of frequency $f_r$ arrives at receiver antenna 4 with its frequency $f_r$ being shifted by the Doppler effect. The Doppler shift of the carrier frequency $f_r$ is not relevant to this embodiment, since all measurements are made on the modulating frequency $f_x$. It is noted and recognized that the Doppler shift $f_{dx}$ on the modulating frequency is very small, since the wavelength is extremely large. The received signal enters ILS localizer receiver via RF amplifier and preselector 14, which accepts and amplifies only the desired frequency $f_r$. Demodulator 33 extracts the modulating signal, including its Doppler shift, from the received signal and conditions it for processing. Doppler detector 34 performs the digital equivalent of heterodyning the output of demodulator 33, $f_x + $ of $_{dx}$, with the output of frequency synthesizer 35, $knf_x$, which is controlled by frequency standard 15.

The functional components of Doppler detector 34 are shown by FIG. 6, where bandpass filter 37 smooths the demodulated signal. Frequency multiplier 38 converts the filtered sine wave at a frequency $f_x + f_{dx}$ to a square wave at a frequency $n(f_x + f_{dx})$, which is mixed with output $knf_x$ of frequency synthesizer 35 by digital mixer 39 to provide Doppler frequency signal $knf_{dx}$. The Doppler detector 34 output frequency $knf_{dx}$ is too low to be useful (on the order of 1 Hz); hence the frequency $knf_{dx}$ accordingly is manipulated by Doppler processor 36, which measures increments of wavelength and converts these increments to a new frequency $f_{dx}$ which equals $1/\lambda_{dx}$, and converted to a format suitable for display by groundspeed display 20. The manner in which this is accomplished is shown by FIG. 7, in which the positive-going edges of the square wave pulses at the output of Doppler detector 34 trigger monostable device 40 to generate a latch transfer pulse. Clock pulses from frequency synthesizer 35, at a considerably higher frequency than the Doppler pulses, e.g., 1 kHz, are accumulated by accumulator 41. The pulses in accumulator 41 are released by latch 42 and transferred to divider 43 by latch transfer pulse. That pulse, delayed a brief time such as a few nanoseconds by delay device 44, also re-sets accumulator 41.

Frequency synthesizer 35 also provides clock pulses to the divider 43 that serve as the numerator in its divide-by-"n" circuits, the denominator being the transferred accumulator pulses. The output from divider 43 then will be a frequency that is linearly related to the Doppler frequency, and thus effecting the reciprocal operation $f = k/\lambda$. The operation of the Doppler processor 36 can best be described by an example, with the input signal from the Doppler detector 34 being a square wave at a 1 Hz frequency, i.e., having a 1 second interval between positive-going pulses, and representing a velocity of 116 knots. The operation of the monostable device 40 would cause the pulse pairs, each pair consisting of an accumulator reset pulse and a latch transfer pulse, to occur at 1 second intervals. This would result in 1000 of the synthesized 1 kHz pulses to be transferred as binary number packages from accumulator 41 to divider 43 where they become the denominator n of a divide-by-n circuit, the numerator being the 116 KHz input from the frequency synthesizer 35. The result of this division operation is a pulse frequency of 116 Hz, thus establishing for these parameter values a scale factor of 1 Hz/knot. Note that when the velocity decreases to 58 knots, the time interval between positive-going Doppler pulses from the Doppler detector 34 increases to 2 seconds, and that 2000 pulses are accumulated between latch transfer pulses. This doubles the value of the denominator in divider 43 resulting in an output of 58 Hz. Thus 58 Hz correponds to a velocity of 58 knots, and the relation of 1 Hz/knot is maintained.

It can be observed that at very low velocities, and using a 12 bit accumulator, the interval between the positive-going Doppler pulses can increase to a value that would cause erroneous indications due to accumulator 41 overrun. For example, at a velocity of 11.6 knots, there would be 10,000 pulses accumulated between latch transfer pulses, which could not be accommodated by a 12 bit accumulator. However, when low velocities are anticipated, the synthesized mixing frequency $knf_x$ from frequency synthesizer 35 could be offset in a positive direction such that when it is mixed in digital mixer 39 with the output of frequency multiplier 38, it provides a known and non-zero to-the-station "Doppler" at the zero velocity condition. This would result in lesser intervals between positive-going Doppler pulses at low velocities, with corresponding lesser reference pulse accumulations. Of course, a similar result could be achieved by reducing the synthesized clock rate into accumulator 41, but this would tend to increase the total system quantization error. A negative direction frequency offset could be used to provide an increasing data update rate with decreasing velocity.

The output of divider 43 can be used to actuate either a digital or analog display as represented in FIG. 5 by groundspeed display 20. A preferred display configuration also is shown in FIG. 7, in which quantization errors and system noise is smoothed prior to display. The digital output of divider 43 is converted to an analog voltage, for example 10 mv per knot, by the D/A converter 45. The noise on that voltage signal is smoothed by filter 46, and the smoothed analog signal then is re-converted to digital format by A/D converter 47 for presentation on groundspeed display 20. It is also evident that an anlog groundspeed display, e.g., a voltmeter calibrated in knots, could be driven directly from the output of either D/A converter 45 or filter 46.

There is a data hold capability that holds the output of divider 43 at its most recent value whenever there is a brief signal interruption. This provides a velocity memory to assure display continuity during the interrupt period. The velocity memory is initiated by flag alarms 48, these alarms being activated by signal deterioration below a threshold level caused by transmitter, receiver, or propagation difficulties. When a flag alarm occurs, gate control 49 opens switches 50 and 51, hold the denominator value in divider 43 at the value that existed at the time flag alarm 48 was activated. Since the numerator provided by frequency synthesizer 35 maintains a constant value, the output of divider 43 maintains a constant value corresponding to the groundspeed at the time of alarm action. When the signal returns to normal and the alarm is deactivated, switches 50 and 51 are sequenced such that the first Doppler pulse closes switch 50 and accumulator 41 resumes its function. After several pulses have been accumulated, switch 51 is conditioned to close at the next Doppler pulse. The output of divider 43 again corresponds to current groundspeed. Of course, if the signal interruption extends beyond a few seconds, the groundspeed display 20 should be deactivated.

Figure 8:
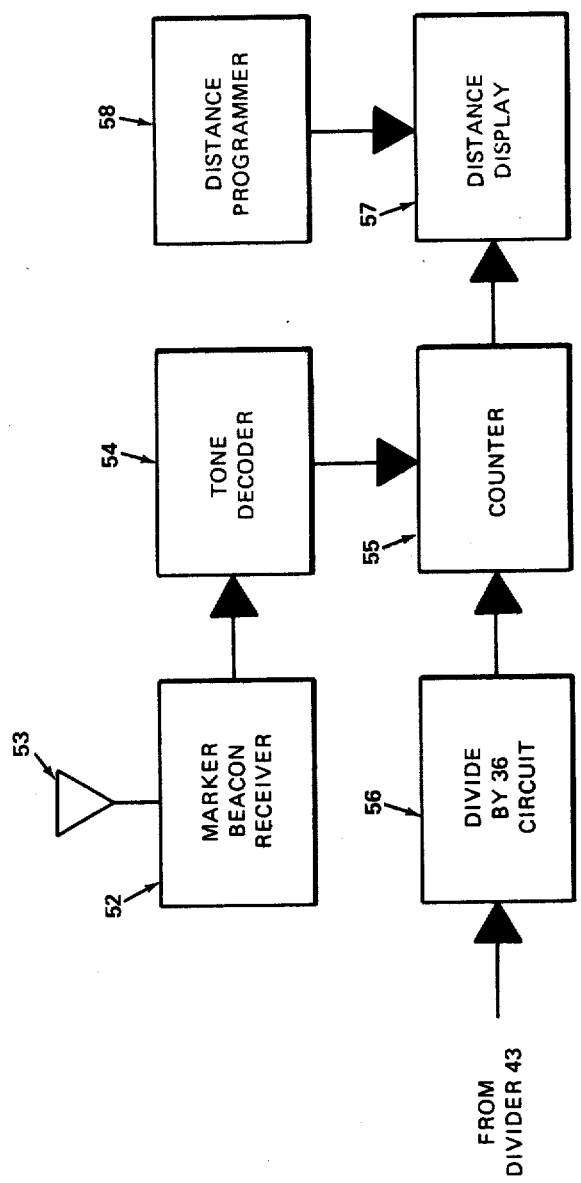
FIG. 8 shows a representative odometer for measuring range to or from a fixed point.

Referring to FIG. 8, there is shown an odometer feature of my invention that determines distance from a ground reference point, by obtaining a position fix such as from a beacon marker of an instrument landing system, and integrating range rate from that position fix. The marker beacon receiver 52 via antenna 53 detects the vertical fan beam signal transmitted by the marker beacon, and the signal is demodulated by the tone decoder 54. The demodulated signal activates the counter 55, which then begins counting output pulses from divider 43 which have been reduced in quantity by the divide-by-36 circuit 56. The pulse count is converted to distance by distance display 57, and the display will read distance from marker beacon. The scale factors used in this illustration will provide one count for each 0.01 nm. In the event that it is desired to read distance-to-go to some well defined location, such as the runway glide path intercept point (GPIP) on an instrumented runway, the display programmer 58 issues the appropriate instructions to distance display 57. The pulses provided by couner 55 would then "count down" from the distance between marker beacon and GPIP, thus providing a display of distance remaining between aircraft and GPIP. The odometer can be updated, or reactivated, by successive marker beacons on the final approach.

Many possible embodiments may be made of this invention without departing from the scope thereof, and accordingly it is to be understood that all matters herein set forth or shown in the accompanying drawings are to be interpreted as illustrative and not in a limiting sense.

What is claimed is:

1. A method of measuring the motion of a receiving station relative to a transmitting station, comprising:
    generating electromagnetic energy in the radio frequency spectrum at the transmitting station;
    radiating said energy;
    detecting said energy at the receiving station;
    heterodyning said detected energy at said receiving station to generate a first reference frequency;
    synthesizing a second reference frequency at said receiving station which has a value equal to said first reference frequency when there is no relative motion between said transmitting station and said receiving station;
    mixing said first reference frequency with said second reference frequency to isolate a Doppler frequency; and
    processing said Doppler frequency to generate a signal having a value that is functionally related to said relative motion.

2. A method for measuring the motion of a receiving station relative to a transmitting station, comprising:
    generating electromagnetic energy in the radio frequency spectrum at the transmitting station;
    sampling a part of said energy;
    generating a first reference frequency;
    mixing said sampled energy and said first reference frequency to generate a difference frequency;
    modulating the energy output of said transmitting station with said difference frequency;
    detecting said modulated energy output at said receiving station;
    generating a second reference frequency at said receiving station;
    synthesizing at said receiving station additional frequencies from said second reference frequency;
    heterodyning said detected energy with said synthesized additional frequencies to produce a third reference frequency;
    demodulating said detected energy;
    mixing said demodulated energy with said reference frequency to produce a Doppler frequency; and
    processing said Doppler frequency to produce a signal having a value that is functionally related to said relative motion.

3. A method of measuring the motion of receiving station relative to transmitting station, comprising:
    generating electromagnetic energy in the radio frequency spectrum at the transmitting station;
    generating a modulation signal and applying said signal to said energy;
    radiating said electromagnetic energy with said modulation signal impressed thereon;
    detecting at the receiving station said energy radiated by said transmitting station;
    demodulating said detected energy;
    generating a reference frequency at a value having a known relation to the frequency of said modulation signal impressed on said energy radiated by said transmitting station; and
    mixing said demodulated signal with said reference signal to generate a Doppler signal having a parameter value that is functionally related to said relative motion.

4. A method of measuring the motion of a receiving station relative to a transmitting station as recited in claim 3 including multiplying the frequency of said demodulated energy and mixing said multiplied frequency with a synthesized frequency that is a synchronized multiple of said transmitter modulation signal frequency to generate said Doppler signal.

5. A method of measuring the motion of a receiving station as recited in claim 3, including multiplying the frequency of said demodulated energy and mixing said multiplied frequency with a synthesized frequency that is offset from a synchronized multiple of said transmitter modulation signal frequency to generate said Doppler signal.

6. A method of measuring the motion of a receiving station relative to a transmitting station as recited in claim 3, including measuring an increment of the wavelength of said Doppler signal by accumulating a first quantity of pulses that is proportional to said increment and generating a second quantity of pulses that is proportional to the frequency of said Doppler signal.

7. A method of measuring the distance of a receiving station from a reference location comprising detecting a directional beam of electromagnetic energy radiated from a first ground station; generating pulses having a repetition frequency proportiponal to the range rate of said receiving station relative to a second ground station; counting said pulses for a finite period of time, initiating said counting action in response to the detection of said directional beam; and converting the quantity of pulses counted in said finite period of time to units of distance.

8. A method of measuring the distance of a receiving station from a reference location as in claim 7 wherein said pulse count is converted to distance units from said receiving station to said first ground station.

9. A method of measuring the distance of a receiving station from a reference location as in claim 7 wherein said pulse count is converted to distance units from said receiving station to said second ground station.

10. A method of measuring the distance of a receiving station from a reference location as in claim 7 wherein said pulse count is converted to distance units from said receiving station to a designated point along a straight line that passes through said first and second ground stations.

11. A method of measuring the distance of a receiving station from a reference location as in claim 7 wherein said first ground station is a marker beacon component of an instrument landing system.

12. A method of measuring the distance of a receiving station from a reference location as in claim 7 wherein said second ground station is the localizer component of an instrument landing system.

* * * * *